Patented Aug. 9, 1938

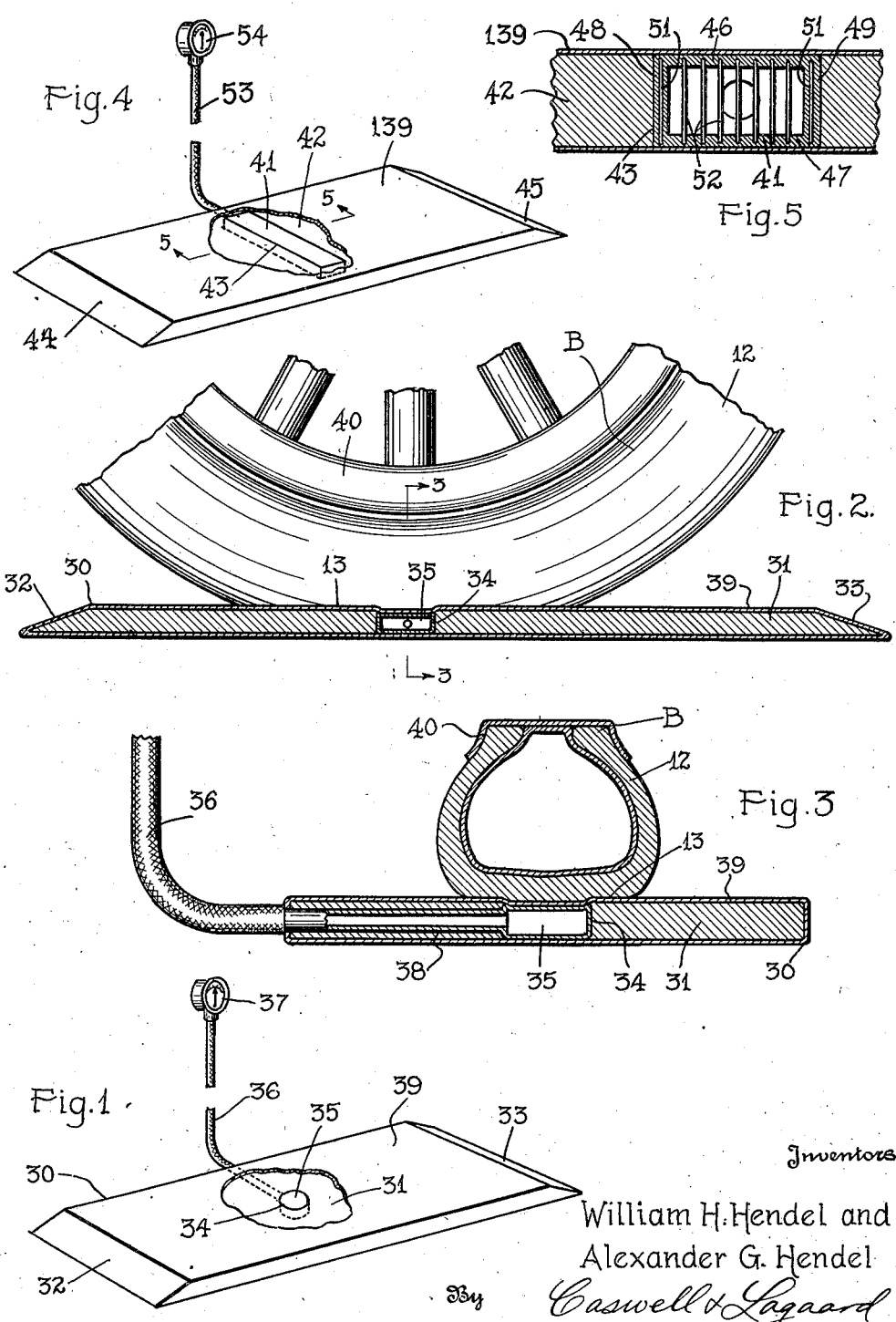

2,126,327

UNITED STATES PATENT OFFICE 2,126,327

TIRE PRESSURE MEASURING DEVICE

William H. Hendel and Alexander G. Hendel, Minneapolis, Minn.

Application May 21, 1936, Serial No. 80,972

12 Claims. (Cl. 73—31)

Our invention relates to devices for measuring the pressure of pneumatic tires and has for its object to provide a fluid operated device capable of indicating the pressure in a tire without removal of the valve cap thereof or the release of any of the air from the tire.

An object of the invention resides in providing a fluid operated device, over which the tire on a vehicle may be run and by means of which the pressure in the tire may be indicated through the action of the unit pressure of the tire on such device.

Another object of the invention resides in providing a device of the character referred to which will not require accurate spotting of the tire.

A still further object of the invention resides in providing a device capable of indicating tire pressure when the tire is partly supported by the device.

An object of the invention resides in providing a hollow contractible body having a fluid therein, said body being adapted to be contracted by engagement of a tire therewith and in further providing a pressure responsive device connected with said hollow body subject to the pressure of the fluid for indicating the pressure within the tire applied to the body.

Another object of the invention resides in providing a plate having a cavity therein and in disposing within said cavity a fluid tight sack of flexible material adapted to be compressed by a tire resting upon the plate.

A still further object of the invention resides in constructing said device in the form of a mat or tread, over which the vehicle tire may be run.

Another object of the invention resides in providing a device which will be small and compact in size.

An object of the invention resides in constructing the contractible body with two spaced walls and in providing cords extending between said walls for restraining said walls from movement away from one another.

Another object of the invention resides in providing an elongated contractible member of a length greater than the width of the supporting area of the tire and of a width less than the length of the supporting area of the tire for engagement with the tire.

Other objects of the invention reside in the novel combination and arrangement of parts and in the details of construction hereinafter illustrated and/or described.

In the drawing:

Fig. 1 is a perspective view of a pressure measuring device illustrating an embodiment of our invention.

Fig. 2 is a longitudinal sectional view of the structure shown in Fig. 1, illustrating a tire resting upon the same.

Fig. 3 is a cross sectional view taken on line 3—3 of Fig. 2 and drawn to a slightly larger scale.

Fig. 4 is a view similar to Fig. 1 of a modification of the invention.

Fig. 5 is a fragmentary longitudinal sectional view of one portion of the mat shown in Fig. 4, drawn to an enlarged scale.

This application for patent is a continuation in part of our copending application for patent, Serial No. 510,184, filed January 21, 1931 and which has matured into a Patent No. 2,051,042.

In the measuring of the pressure of pneumatic tires, considerable difficulty and inconvenience is encountered in the ordinary method in removing the valve caps and applying to the valve stems the ordinary pressure gauge now available for such purpose. Furthermore, measuring of tire pressure by such methods requires more or less time and is a rather dirty task. The instant invention overcomes these disadvantages by providing a device over which the tire of a vehicle may be run, and which will directly and without effort to the observer, indicate the pressure of the tire resting upon the same. The present invention contemplates the use of one or more measuring devices to be utilized on one or more of the tires, so that the pressures of the various tires may be simultaneously indicated. The invention further contemplates the use of the measuring device as a portable structure capable of being brought to the vehicle and placed on any floor or surface and the vehicle run upon the same and also contemplates the permanent mounting of the devices in conjunction with run-ways leading up to the same and with the various pressure gauges all situated in close proximity to one another to permit of readily ascertaining the pressures in the various tires.

For the purpose of illustrating the application of the invention, a portion of a vehicle tire B has been shown, which comprises the usual casing 12, mounted upon a wheel of the vehicle which has been partly shown at 40. The tire illustrated is assumed to be inflated and the contacting surface thereof when supporting the vehicle proper is designated by the numeral 13 in Figs. 2 and 3.

In Figs. 1 to 3 inclusive, we have shown one form of the invention. This device comprises a tread or mat which we have indicated in its entirety at 30 and which is planiform and of a relatively thin thickness. This mat may have an area either less than or greater than the supporting surface 13 of the tire whose pressure is to be measured. The mat 30 is provided with a plate-like member 31 constructed of wood, fiber, metal or some other similar substance capable of supporting the major portion of the weight of the tire without appreciable deformation. This plate is beveled at its ends to divide ramps designated by the reference characters 32 and 33 and is formed at the central portion thereof with a circular opening 34, extending completely through the same. Within this opening is placed a sack 35 of rubber or some other suitable fluid tight flexible material, which is connected through an armored hose 36 with a gauge 37 of the Bourdon type or its equivalent. The hose 36 passes through an opening 38 in the plate 31, which communicates with the opening 34. The sack 35 is preferably cylindrical to substantially occupy the entire space formed by the opening 34 in the plate 31, when in its normal position. The entire mat or tread 30 may be covered with a covering of canvas 39 to protect the same and particularly the sack 35.

For actuating the gauge 37, the chamber within the sack 35, hose 36 and the actuating member of gauge 37 are filled with any suitable fluid. Liquids such as glycerine, alcohol, water, certain types of oil, castor-oil, various types of mineral and vegetable oils, mercury and mixtures of such liquids may be used. Where a gas is employed, air is preferable, though any other inert gas may be utilized, which will not react with the material with which the mat is formed. Such gas may be under pressure if desired, depending upon the construction of the device and the type of pressure responsive mechanism employed.

For the purpose of filling the device with the fluid, any suitable means and method may be used, such as is now well known in the art. A tube connected to the sack 35 may be provided, which is sealed after the device is filled. Suitable hose connections may be provided at each end of the hose, which may be disconnected when it is desired to fill the device. After the device has been filled, the connections may again be attached to bring the gauge into communication with the contractible chamber.

In the operation of our invention, the tire which is indicated at B is run over the tread 30 until the contacting surface 13 thereof covers the central portion of the same containing the sack 35. The portion 31 being non-yielding and substantially incompressible, supports the major portion of the weight on the tire, while the sack 35 being relatively contractible, receives a certain deformation, depending upon the pressure of the air in the tire proper. This causes a reading of the gauge 37, which may be calibrated to directly indicate the air pressure within the tire. We have found that the unit air pressure in the tire is substantially proportional to the gauge reading, indicating that the unit pressure in the tire is transmitted through the upper portion of sack 35, and through the liquid therein to the gauge proper.

Although we have shown and described a single mat or tread for use with one of the tires of the vehicle at a time, it can readily be comprehended that four such mats may be employed and permanently or temporarily mounted so that the vehicle may be driven with all the wheels thereon resting upon the mats. It is also to be understood that the gauges from the various mats or treads may be assembled collectively and, if desired, in a single case, so that the pressure in all of the tires may be quickly ascertained. Although we have shown the structure for forming the contractible chamber as constructed of rubber or some other resilient material, it can readily be comprehended that the same may be constructed in various different forms.

In Figs. 4 and 5 we have shown another form of the invention in which an elongated sack 41 is used in place of the cylinder sack 35. In this device a plate-like member 42 is used in place of the member 31 which is identical therewith except that the same is constructed with an elongated opening or cavity 43 therein instead of the cylindrical opening 34. This plate-like member has sloping ends or ramps 44 and 45 similar to the ends 32 and 33.

The elongated sack 41 is constructed of rubber or some other suitable flexible material and is provided with spaced upper and lower walls 46 and 47 which are connected together by side walls 48 and 49 and end walls, not shown. Imbedded in the side walls 48 and 49 are reinforcing cords 51 and connecting the walls 46 and 47 together are cords 52 which are closely positioned and which limit movement of the walls away from one another, but permit movement toward one another. These cords are stitched through the walls 46 and 47, and the ends of the reaches thereof are securely imbedded in said walls to resist the stress to which the walls are subjected and to provide a fluid tight construction.

The sack 41 is connected by means of an armored hose 53 with a pressure gauge 54 of the Bourdon or equivalent type. The entire device including the sack 41, hose 53 and the actuating element of gauge 54 are completely filled with some suitable fluid as previously described. A covering 139 covers the members 41 and 42.

The operation of the form of the invention disclosed in Figs. 4 and 5 is similar to that disclosed in Figs. 1, 2 and 3. The tire is run on the mat 30 until the same rests partly on the mat and partly on the sack 41. The sack 41 is longer than the width of the contacting surface of the tire so that the entire surface of the sack is not covered. The contacted part of the sack becomes depressed and the cords 52 yield to permit of compression while the part not contacted remains in normal position, movement of the walls 46 and 47 thereof away from each other being restrained by said cords. We have found that the unit pressure in the tire causes a corresponding pressure indication on the gauge which may be calibrated to read directly the unit pressure in the tire.

The invention is highly advantageous in that an extremely simple and effective device is produced whereby the pressures in the tires of vehicles may be quickly and positively determined without removing the caps and applying a pressure gauge to the tire valves. The device may be constructed without jointed metal parts if desired, so as to eliminate the disadvantages following mechanical devices embodying such construction. The device is extremely positive in action and sufficiently accurate for the desired purpose. The gauges can be calibrated to read directly in pounds per square inch of pressure, indicating the exact air pressure within the tire. The device can be constructed from readily available materials and at an extremely economical price, so that the same may be universally sold and adopted. The device may be made so that the same is extremely light and may be readily moved about as the occasion demands. Our invention may be permanently installed in conjunction with a run-way over which vehicles may be run or the same may be portable and moved about as desired.

Changes in the specific form of our invention as herein disclosed may be made within the scope of what is claimed, without departing from the spirit of our invention.

Having described our invention, what we claim as new and desire to protect by Letters Patent is:

1. A pneumatic tire pressure measuring device comprising a substantially incompressible support having an upper surface for carrying a portion of the load on a pneumatic tire, said support having a cavity therein extending through said surface, a contractible sack occupying the space provided by said cavity and having a fluid therein, and carrying another portion of the load on the tire, and pressure responsive means connected with said sack and responsive to the pressure of said fluid for indicating the pressure within the tire.

2. A pneumatic tire pressure measuring device comprising a substantially incompressible support having an upper surface for carrying a portion of the load on a pneumatic tire, said support having a cylindrical cavity therein extending through said surface, a contractible cylindrical sack occupying the space provided by said cavity and having a fluid therein and carrying another portion of the load on the tire, and pressure responsive means connected with said sack and responsive to the pressure of said fluid for indicating the pressure in the tire.

3. A pneumatic tire pressure measuring device comprising a substantially incompressible support having an upper surface for carrying a portion of the load on a pneumatic tire, said support having an elongated cavity extending through said surface, an elongated contractible sack occupying the space provided by said cavity and having a fluid therein, said sack supporting a portion of the load on the tire and pressure responsive means connected to said sack and subject to the pressure of the fluid therein for indicating the pressure in the tire.

4. A pneumatic tire pressure measuring device comprising a substantially incompressible support having an upper surface and forming a runway for supporting a portion of the load on a pneumatic tire, said support having a transverse groove therein extending through said surface, an elongated hollow contractible member occupying the space provided by said groove and having a fluid therein, said contractible member supporting a portion of the load on the tire, and pressure responsive means connected to said contractible member and subject to the pressure of the fluid therein for indicating the pressure in the tire.

5. A pneumatic tire pressure measuring device comprising a substantially incompressible support having an upper surface and forming a runway for supporting a portion of the load on a pneumatic tire, said support having a transverse groove therein extending through said surface, an elongated hollow contractible member occupying the space provided by said groove and having a fluid therein, said contractible member supporting a portion of the load on the tire, and being of a length greater than the width of the supporting surface of the tire and of a width less than the length of such surface, means for restraining expansion of said contractible member, and pressure responsive means connected to said contractible member and subject to the pressure of the fluid therein for indicating the pressure in the tire.

6. A pneumatic tire pressure measuring device comprising a substantially incompressible support having an upper surface and forming a runway for supporting a portion of the load on a pneumatic tire, said support having a transverse groove therein extending through said surface, an elongated hollow contractible member occupying the space provided by said groove and having a fluid therein, said contractible member supporting a portion of the load on the tire, and being of a length greater than the width of the supporting surface of the tire and of a width less than the length of such surface, said contractible member having two spaced walls, tethering members extending between said walls and restraining spreading thereof, and pressure responsive means connected to said contractible member and subject to the pressure of the fluid therein for indicating the pressure in the tire.

7. A pneumatic tire pressure measuring device comprising a support having an upper surface on which a portion of a tire rests, said support having a cavity therein extending through said surface, a receptacle occupying the space provided by said cavity and being provided with a pressure transmitting member having a surface forming substantially a continuation of the surface of said support and on which another portion of the tire rests, and pressure responsive means connected with said receptacle and subject to the pressure of said fluid for indicating the pressure in the tire.

8. A pneumatic tire pressure measuring device comprising a support having an upper surface on which a portion of a tire rests, said support having a cylindrical cavity therein extending through said surface, a cylindrical receptacle occupying the space provided by said cavity and being provided at one end with a pressure transmitting member having a surface forming substantially a continuation of the surface of said support and on which another portion of the tire rests, and pressure responsive means connected with said receptacle and subject to the pressure of said fluid for indicating the pressure in the tire.

9. A pneumatic tire pressure measuring device comprising a support having a supporting surface on which a portion of a tire rests, a receptacle having a fluid therein and having a pressure transmitting member provided with a supporting surface lying adjacent to and substantially in continuation of the supporting surface of said support on which another portion of the tire rests, and pressure responsive means connected with said receptacle and subject to the pressure of said fluid for indicating the pressure in the tire.

10. A pneumatic tire pressure measuring device comprising a support having an upper surface on which a portion of a tire rests, a receptacle having a fluid therein, pressure transmitting means provided with a supporting surface lying adjacent to and substantially in continuation of the supporting surface of said support on which another portion of the tire rests, said pressure transmitting means being arranged to transmit pressure to said fluid, and pressure responsive means connected with said receptacle and subject to the pressure of said fluid for indicating the pressure in the tire.

11. A pneumatic tire pressure measuring device comprising a support having an upper surface on which a portion of a tire rests, a receptacle having a fluid therein and having a pressure transmitting member provided with a surface forming a substantially unbroken continuation of the upper surface of said support and disposed at substantially the same elevation as said surface and on which another portion of the tire rests, and pressure responsive means connected with said receptacle and subject to the pressure of said fluid for indicating the pressure in the tire.

12. A pneumatic tire pressure measuring device comprising a support having an upper surface on which a portion of a tire rests, a receptacle having a fluid therein, a covering for said receptacle over-lying the same and constituting a pressure transmitting member provided with a surface lying adjacent to and substantially in continuation of the upper surface of said support and on which another portion of the tire rests and pressure responsive means connected with said receptacle and subject to the pressure of said fluid for indicating the pressure in the tire.

WILLIAM H. HENDEL.
ALEXANDER G. HENDEL.